US006999072B2

(12) United States Patent
Imai

(10) Patent No.: US 6,999,072 B2
(45) Date of Patent: Feb. 14, 2006

(54) DATA PROCESSING METHOD, DATA PROCESSING PROGRAM AND RECORDING MEDIUM

(75) Inventor: Shigeaki Imai, Uji (JP)

(73) Assignee: Minolta Co., Ltd., Osaka (JP)

( * ) Notice: Subject to any disclaimer, the term of this patent is extended or adjusted under 35 U.S.C. 154(b) by 440 days.

(21) Appl. No.: 10/400,478

(22) Filed: Mar. 28, 2003

(65) Prior Publication Data

US 2003/0185435 A1    Oct. 2, 2003

(30) Foreign Application Priority Data

Mar. 29, 2002  (JP) .............................. 2002-094843

(51) Int. Cl.
*G06T 15/00* (2006.01)
(52) U.S. Cl. .................. 345/419; 382/154; 396/24
(58) Field of Classification Search ............... 345/419, 345/420, 629; 382/154, 173, 278; 396/20, 396/25, 429
See application file for complete search history.

(56) References Cited

U.S. PATENT DOCUMENTS

| 6,556,783 B1 * | 4/2003 | Gelphman ................... 396/20 |
| 6,792,140 B1 * | 9/2004 | Matusik et al. ............. 382/154 |
| 6,826,299 B1 * | 11/2004 | Brown et al. ................ 382/154 |
| 6,847,462 B1 * | 1/2005 | Kacyra et al. .............. 356/601 |

OTHER PUBLICATIONS

"Multiple View Geometry in Computer Vision", R. I. Hartley, A. Zisserman, Cambridge University Press, 2000 Part 0-3, Part I-6, Part II-10.

* cited by examiner

*Primary Examiner*—Phu K. Nguyen
(74) *Attorney, Agent, or Firm*—McDermott Will & Emery LLP

(57) ABSTRACT

In order to provide a data processing technique for easily and suitably executing an integrating process for a plurality of image groups obtained successively from different directions against the object to be the base for generating a three-dimensional shape data of an object, while the object SB in a first posture placed on a rotary stage is being rotated, images of the object SB are successively photographed by a photographing device so that a first image group is obtained. The posture of the object SB is changed into a second posture, so that a second image group of the object SB is obtained similarly. Corresponding points Sp1, Sp2, Sp3 and the like of the object SB are specified on a partial first image extracted from the first image group and a partial second image extracted from the second image group. Conversion parameters of the first and second image groups are calculated from the information about the specified plural corresponding points, so that the integrating process is executed. As a result, the integrating process for the plural image groups can be executed easily and suitably.

12 Claims, 13 Drawing Sheets

DATA PROCESSING METHOD, DATA PROCESSING PROGRAM AND RECORDING MEDIUM

This application is based on application No. JP 2002-94843 filed in Japan, the contents of which is hereby incorporated by reference.

BACKGROUND OF THE INVENTION

1. Field of the Invention

The present invention relates to an improved three-dimensional shape data processing technique. Particularly, the invention relates to a data processing technique for handing a plurality of two-dimensional outline data which is the base of generation of three-dimensional shape data for reproducing a solid object.

2. Description of the Related Art

As a method of generating three-dimensional shape data of an object to be measured three-dimensionally, there is a method utilizing a Shape From Silhouette (SFS) method. There will be simply explained below this method.

Firstly, an object is placed on a rotary stage, and while the rotary stage is being rotated once, the object is successively photographed by a photographing device such as a digital cameral fixed in a three-dimensional space so that a plurality of image data are obtained. Silhouette images are created by extracting outline shapes of the object from the obtained plural images, and three-dimensional data of the object are generated by the SFS method based on the silhouette images.

In the case where the three-dimensional data are created in such a manner, when the object is photographed by one photographing device, there is a case where the three-dimensional shape of the object cannot be sufficiently reproduced. For example, even if the object is successively photographed from a lateral direction, shape information about an upper portion or a lower portion of the object cannot sufficiently obtained.

In order to solve this problem, after the rotary stage is rotated so that an image group is once obtained, the direction of the object is changed so as to be rotated and an image group is obtained one more time. In this case, the shape information about the object which is insufficient in the first image group can be compensated by the second image group.

However, in the case where the direction of the object is changed and the image groups are obtained twice in the above manner, there arises a problem that the image group before the change and the image group after the change cannot be easily integrated. Namely, when the three-dimensional shape data of the object to be generated from the image group before the change are directly integrated with the three-dimensional shape data of the object from the image group after the change, a lot of labor and time are required for the integration.

OBJECTS AND SUMMARY

The present invention is devised in order to solve the above problem, and its object is to provide an improved three-dimensional shape data processing technique. More specifically, it is an object of the invention to provide a data processing technique for handing a plurality of two-dimensional outline data to be a base in generation of three-dimensional data for reproducing a solid object. More concretely, it is an object of the invention to provide a data processing technique which is capable of easily and quickly integrating a plurality of image groups which are obtained successively from different direction of the object and are to be the base for generating the three-dimensional data of the object.

In order to achieve the above object and another objects, a data processing method of handing a plurality of two-dimensional data to be the base for generating three-dimensional shape data for reproducing a solid object according to a certain aspect of the present invention includes: (a) the first obtaining step of successively photographing the solid object along a first path around the solid object so as to obtain a plurality of first images; (b) the step of relating the plural first images to each other in a first three-dimensional coordinate system; (c) the second obtaining step of successively photographing the solid object along a second path around the solid object so as to obtain a plurality of second images; (d) the step of relating the plural second images to each other in a second three-dimensional coordinate system; (e) the first specifying step of specifying a plurality of first corresponding points corresponding to a plurality of points appearing on the solid object on a partial first image extracted from the plural first images; (f) the second specifying step of specifying a plurality of second corresponding points corresponding to the plural points on a partial second image extracted from the plural second images; and (g) the step of obtaining relative information about the first three-dimensional coordinate system and the second three-dimensional coordinate system based on the plural first corresponding points specified on the partial first image and the plural second corresponding points specified on the partial second image.

In addition, in another aspect, in the data processing method, the first obtaining step includes (a-1) the step of while rotating the solid object about a predetermined rotary axis in a state that the a tilt posture of the solid object with respect to an axial direction of the predetermined rotary axis is held in a first posture, photographing the solid object from a predetermined photographing position fixed in a three-dimensional space so as to obtain the plural first images, and the second obtaining step includes (c-1) the step of while rotating the solid object about the predetermined rotary axis in a state that the tilt posture of the solid object with respect to the axial direction of the predetermined rotary axis is held in a second posture, photographing the solid object from the predetermined photographing position so as to obtain the plural second images.

Further, in another aspect, the data processing method further includes the step of obtaining relative rotation information for defining a relative rotational relationship between the photographing position and the rotary axis before the first obtaining step and the second obtaining step, and the first path and the second path are derived based on the relative rotation information of the predetermined photographing position.

In addition, a data processing program according to a certain aspect of the present invention, which is capable of being executed by a computer contained in a processing unit for handing a plurality of two-dimensional data to be the base for generating three-dimensional shape data for reproducing a solid object, allows the processing unit to execute: (a) the first input step of inputting a plurality of first images obtained by successively photographing the solid object along a first path around the solid object; (b) the step of relating the plural first images to each other in a first three-dimensional coordinate system; (c) the second input step of inputting a plurality of second images obtained by successively photographing the solid object along a second path around the solid object; (d) the step of relating the plural second images to each other in a second three-dimensional coordinate system; (e) the first specifying step of specifying a plurality of first corresponding points corresponding to a plurality of points appearing on the solid object on a partial first image extracted from the plural first images; (f) the second specifying step of specifying a plurality of second corresponding points corresponding to the plural points on a partial second image extracted from the plural second images; and (g) the step of obtaining relative information about the first three-dimensional coordinate system and the second three-dimensional coordinate system based on the plural first corresponding points specified on the partial first image and the plural second corresponding points specified on the partial second image.

In addition, the invention according to another aspect is a recording medium for recording the data processing program therein.

BRIEF DESCRIPTION OF DRAWINGS

These and other objects and features of the present invention will become apparent from the following description of preferred embodiments thereof taken in conjunction with the accompanying drawings in which.

In the following description, like parts are designated by like reference numbers throughout the several drawing.

DETAILED DESCRIPTION OF THE PREFERRED EMBODIMENTS

<First Embodiment>

<Main Section Structure of Three-dimensional Data Processing System>

Figure 1:
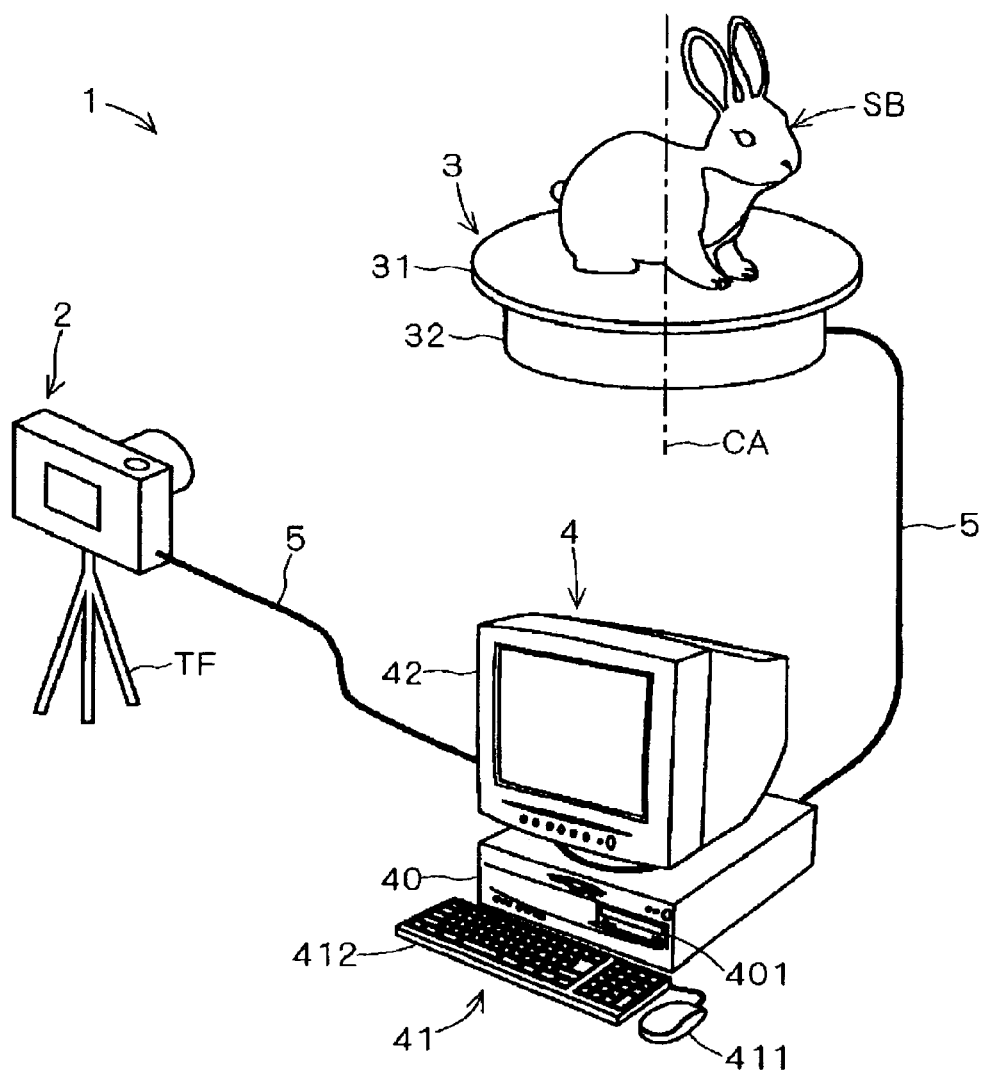
FIG. 1 is a schematic diagram showing a main section structure of a three-dimensional data processing system 1 according to a first embodiment of the present invention.

FIG. 1 is a schematic diagram showing a main section structure of a three-dimensional data processing system 1 according to the first embodiment of the present invention.

The three-dimensional data processing system 1 has a photographing device 2 for photographing an object SB to be three-dimensionally measured, a rotating device 3 for rotating the object SB, and a processing unit 4 for connecting the photographing device 2 and the rotating device 3 via a cable 5 so that they can communicate with each other. The object SB is a bibelot and its shape is constant and stable.

The photographing device 2 is a device utilizing, for example, a digital camera and is capable of obtaining a two-dimensional color image of the object SB as a solid object. Moreover, the photographing device 2 is fixed in a three-dimensional space by a tripod TF.

The rotating device 3 has a rotary stage (rotary table) 31, and a driving section 32 for driving the rotary stage.

The driving section 32 has, for example, a motor, and can rotate the rotary stage 31 about a rotation axis CA. As a result, the solid object placed on the rotary stage 31 can be rotated about the rotation axis CA.

The processing unit 4 is constituted as, for example, a personal computer, and has a box-shaped processing section 40, an operating section 41 and a display section 42.

A front surface of the processing section 40 is provided with a drive 401 for inserting an optical disc 9.

The operating section 41 has a mouse 411 and a keyboard 412, and receives an operational input from a user to the processing unit 4.

The display section 42 is composed of, for example, a CRT, and functions as display means which can display an image.

Figure 2:
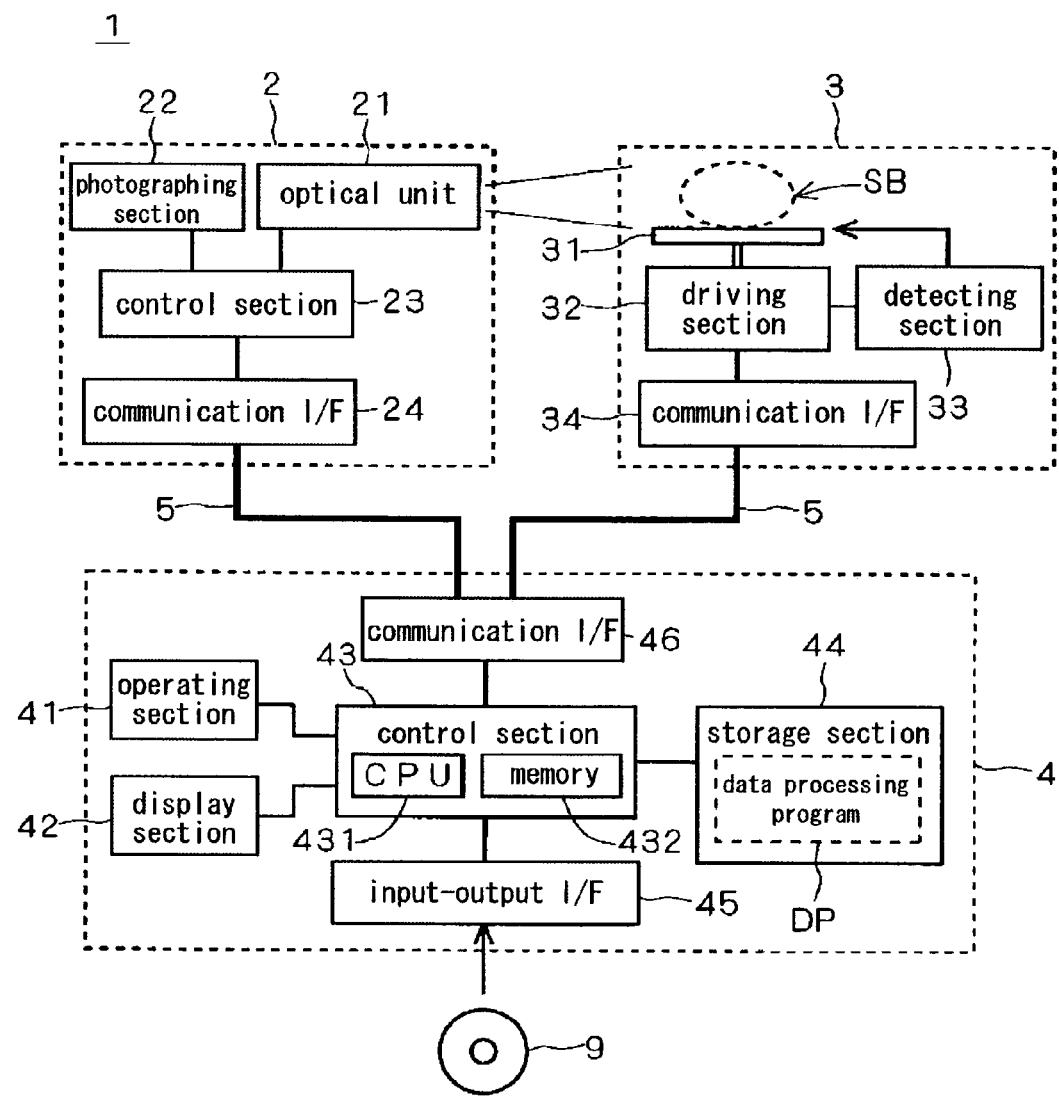
FIG. 2 is a diagram showing a function block of the three-dimensional data processing system 1.

FIG. 2 is a diagram showing a function block of the three-dimensional data processing system 1.

The photographing device 2 has a photographing section 22 for photographing the object SB via an optical unit 21, and a control section 23 connected with these sections transmissively. Moreover, the photographing device 2 has a communication I/F 24 connected with the control section 23 transmissively.

The optical unit 21 has a lens group and a driving section for changing an arrangement of the lens group, and executing focus and zoom so as to image an optical image of the object SB on the photographing section 22.

The photographing section 22 is composed of a photographing element such as a CCD. After an analog image signal of the object SB is obtained by the photographing element, the photographing section 22 makes A/D conversion so as to generate image data of a digital signal.

The communication I/F 24 is an interface for transmitting data with the processing unit 4.

The control section 23 has a CPU and supervisory-controls an operation of the photographing device 2. Moreover, the control section 23 transmits the image data obtained in the photographing section 22 to the processing unit 4 via the communication I/F 24.

The rotating device 3 has a detecting section 33 electrically connected with the driving section 32, and a communication I/F 34.

The detecting section 33 has, for example, an encoder, and detects a rotating angle of the rotary stage 31. The rotating angle detected by the detecting section 33 is fed back to the driving section 32, so that the rotary stage 31 can be rotated about the rotation axis CA by each predetermined angle.

The communication I/F 34 is an interface for transmitting data with the processing unit 4, and receives a rotation control signal of the rotary stage 31 transmitted from the processing unit 4.

The processing unit 4 has a control section 43 connected with the operating section 41 and the display section 42 transmissively. Moreover, the processing unit 4 has a storage section 44 connected with the control section 43 transmissively, and an input-output I/F 45, and a communication I/F 46.

The storage section 44 is constituted as, for example, a hard disc, and stores a data processing program DP.

The input-output I/F 45 is an interface for controlling reception/transmission of data among the operating section 41, the display section 42 and the control section 43.

The input-output I/F 45 is an interface for inputting/outputting data into/from the optical disc 9 as a recording medium via the drive 401.

The communication I/F 46 is an interface for transmitting data between the photographing device 2 and the rotating device 3.

The control section 43 has a CPU 431 and a memory 432 which serve as a computer, and supervisory-controls the operation of the processing unit 4. The control section 43 executes the data processing program DP so as to be capable of integrating respective image groups as mentioned later.

The memory 432 of the control section 43 can store program data such as the data processing program DP recorded in the optical disc 9 via the input-output I/F 45. As a result, the stored program can reflects the operation of the processing unit 4.

<Data Processing Method Utilizing the Three-dimensional Data Processing System 1>

Figure 3:
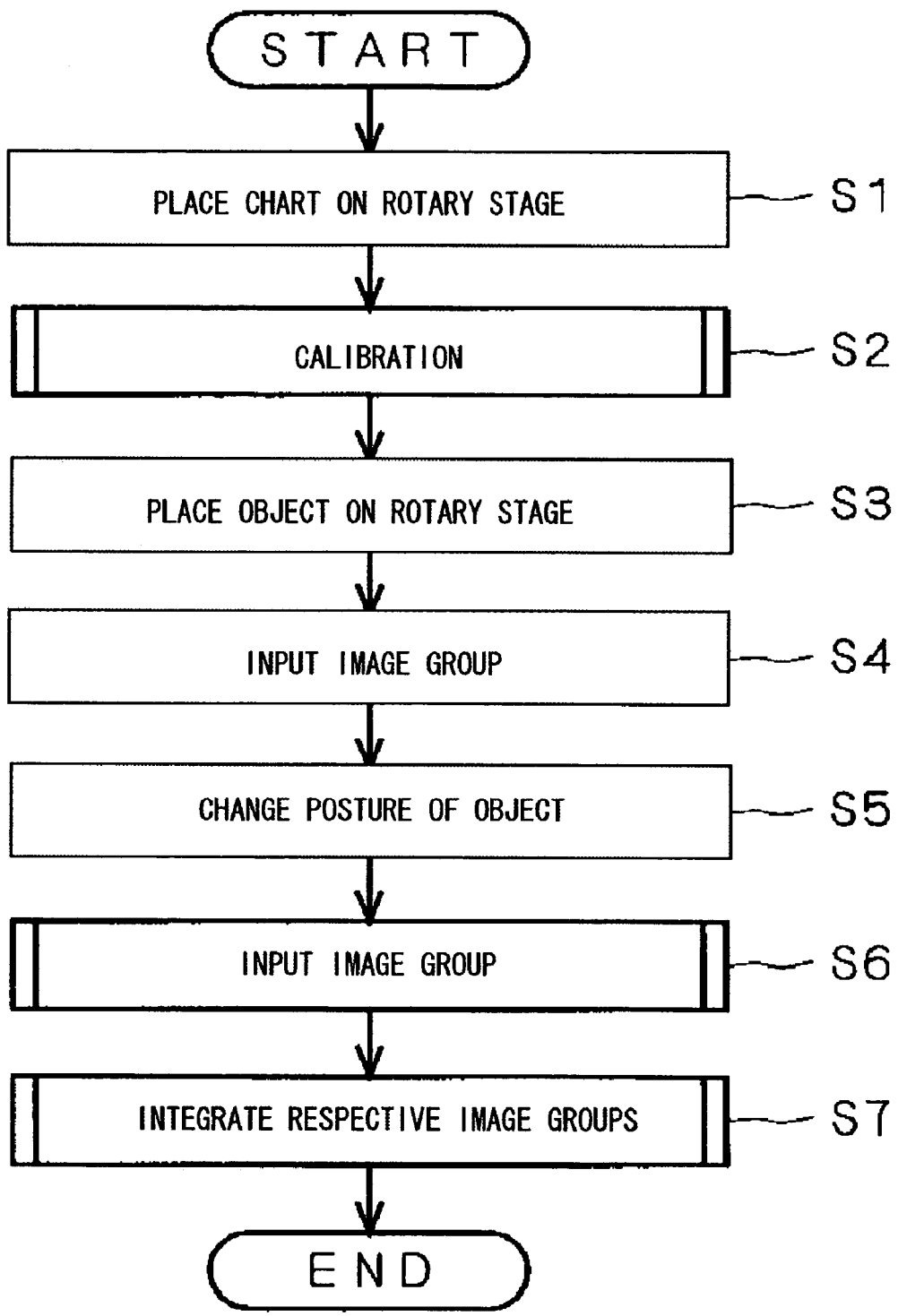
FIG. 3 is a flowchart for explaining a data processing method utilizing the three-dimensional data processing system 1.

FIG. 3 is a flowchart for explaining the data processing method utilizing the three-dimensional data processing system 1. In this method, the steps other than the following steps S1, S3 and S5 are executed by executing the data processing program DP by means of the control section 43.

Figure 4:
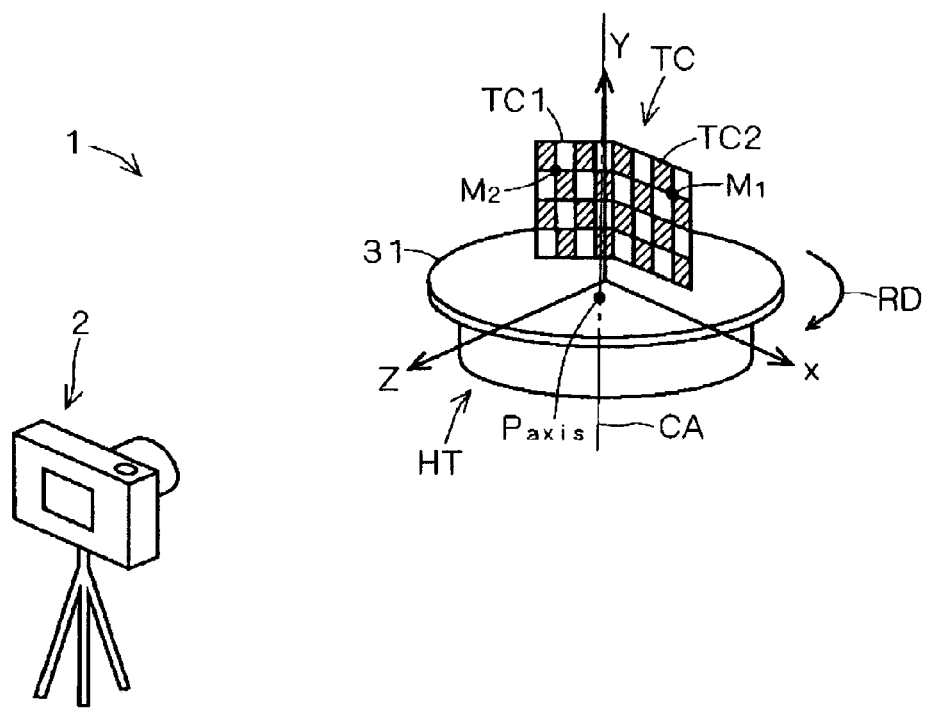
FIG. 4 is a diagram showing a state that a chart TC is placed on a rotary stage 31.
Figure 5:
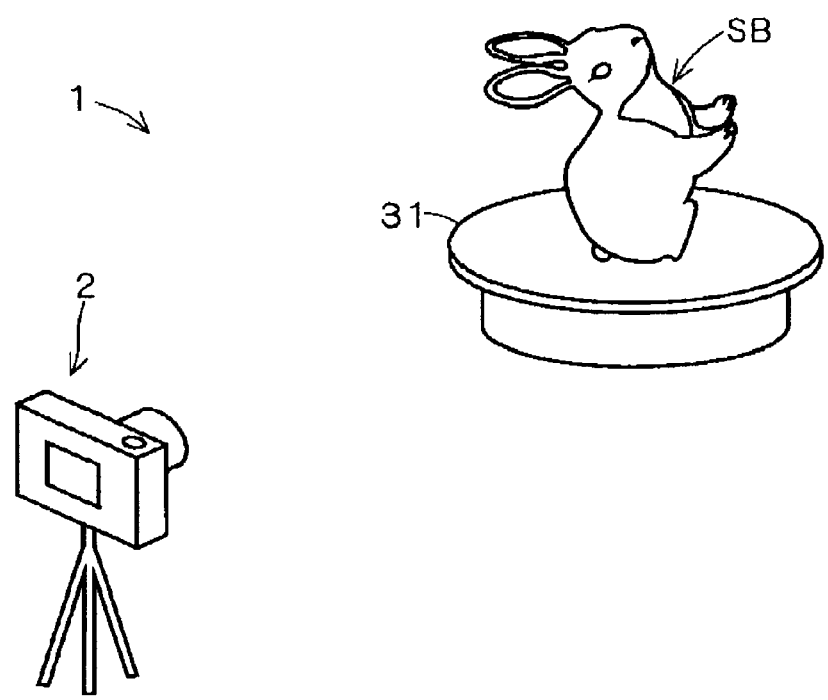
FIG. 5 is a diagram showing a state that an object SB in a second posture is placed on the rotary stage 31.

Firstly after a chart TC shown in FIG. 4 is placed on the rotary stage 31 (step S1), calibration is carried out at step S2 (detailed later).

Next, after the object SB is placed on the rotary stage 31 so as to be in a first posture (horizontally placed) shown in FIG. 1 (step S3), the object SB is successively photographed by the photographing device 2 at step S4 so that a plurality of first images (first image group) are input into the processing unit 4 (detailed later).

After the first posture (FIG. 1) of the object SB is changed into a second posture (longitudinally placed) (step 5), the object SB is successively photographed by the photographing device 2 at step S6 so that second images (second image group) are input into the processing unit 4 (detailed later).

These steps generally correspond to that a tilting posture of the object SB with respect to an axial direction of the rotation axis CA (coincides with the rotation axis of the object SB) of the rotary stage 31 is changed into the first posture and the second posture which are different from each other and the object SB in the respective postures is photographed.

An integrating process of the respective image groups input at steps S4 and S6 is executed at step S7 (detailed later).

Figure 6:
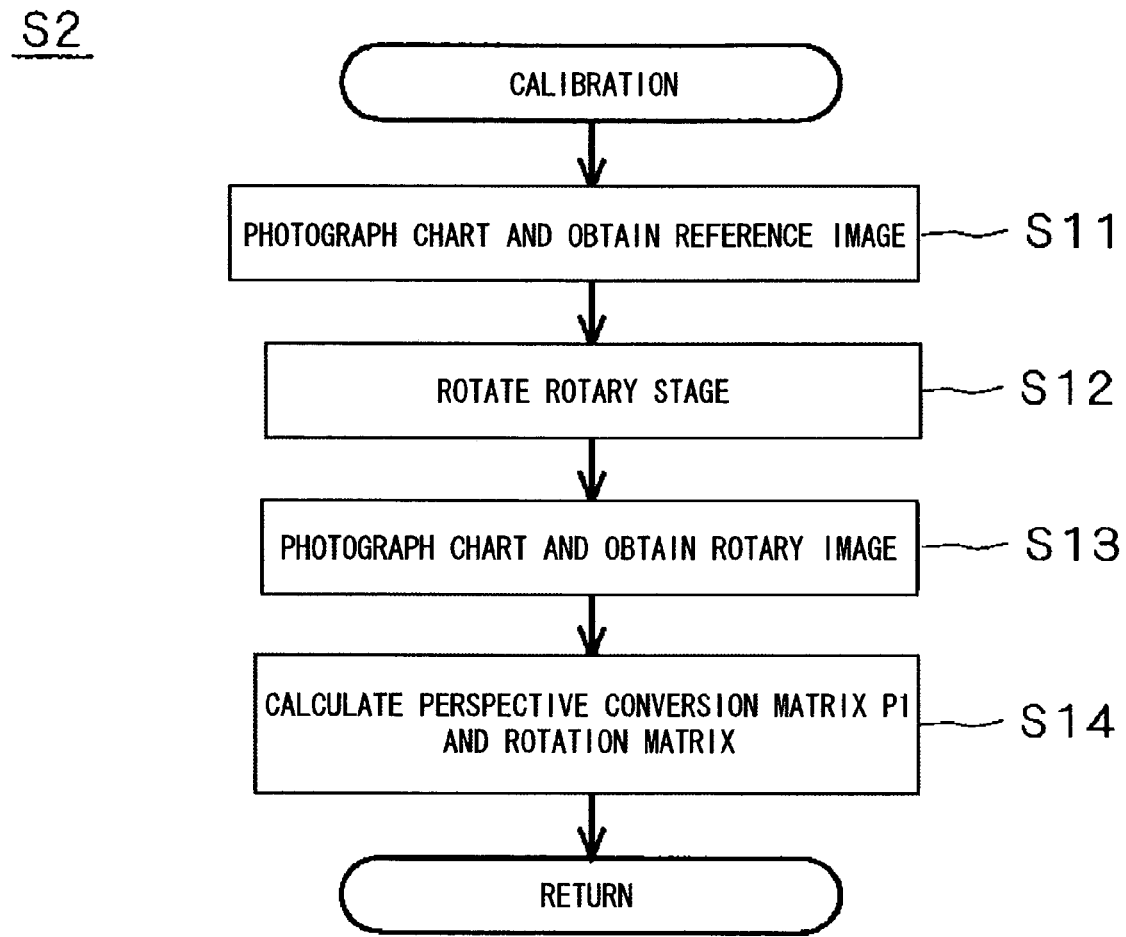
FIG. 6 is a flowchart for explaining an operation of calibration.

FIG. 6 is a flowchart for explaining the calibrating operation corresponding to step S2.

The chart TC is photographed by the photographing device 2 at step S11 so that its image (reference image) is obtained. The chart TC is a solid object in which two plates TC1 and TC2 with a checker are laminated. This photographing is executed so that reference points M, such as points $M_1$ and $M_2$ are printed on the images.

The driving section 32 is actively operated so as to rotate the rotary stage 31 by predetermined angle to a rotating direction RD at step S12.

The chart TC, direction of which is changed at step S13, is photographed so that its image (rotary image) is obtained at step S13. Here similarly to step S11, the photographing is executed so that the reference points $M_i$ shown on the chart TC are printed on the image.

A perspective conversion matrix P1 relating to a reference image and a rotation matrix Q corresponding to relative rotation information in the photographing positions with respect to the rotary axis CA are calculated at step S14.

When the rotation matrix Q is obtained, when the rotary stage 31 is rotated, a path where the photographing device 2 relatively photographs and scans the object placed on the rotary stage 31 is derived. Moreover, relative posture information about the photographing device 2 with respect to the rotary axis CA in the photographing and scanning can be obtained. There will be detailed below the operation at step S14.

A rectangular coordinate system HT of xyz shown in FIG. 6 is set based on a center of an upper surface of the rotary stage 31. As a result, three-dimensional coordinate values $(x_i, y_i, z_i, 1)$ of the reference points $M_i$ such as the points $M_1$ and $M_2$ on the chart TC can be calculated based on the rectangular coordinate system HT.

When coordinates corresponding to the reference points Mi on the reference image photographed at step S11 are $m1_i$ $(u1_i, v1_i, w1_i,)$ and coordinates corresponding to the reference points $M_i$ on the rotary image photographed at step S13 are $m2_i$ $(u2_i, v2_i, w2_i)$, the relationships shown in the following formulas (1) and (2) are established. However, the perspective conversion matrices are $P_1$ and $P_2$.

$$m1_i = P_1 M_i \tag{1}$$

$$m2_i = P_2 M_i \tag{2}$$

Here, since the rotary image is obtained by rotating the chart TC in the posture where the reference image has been photographed by predetermined angle, the following formula (3) is established. Moreover, when both sides of the formula (3) are multiplied by $M_i$, the formula (3) is substituted into the formula (2), the following formula (4) is established.

$$P_2 = P_1 Q \tag{3}$$

$$m2_i = P_2 Q M_i \tag{4}$$

$$Q = q(v_{axis}, p_{axis}) = \begin{bmatrix} R_{axis} & -R_{axis} p_{axis} + p_{axis} \\ 0 & 1 \end{bmatrix} \tag{5}$$

Here, Q in the equations (3) and (4) is represented by the above formula (5). In the formula (5), the axial direction is represented by a vector $V_{axis}$ $(x_a, y_a, z_a)$, and is a rotation matrix relating to the rotary axis CA passing through a point p ($x_p$, 0, $z_p$) on the upper surface of the rotary stage 31 shown in FIG. 4. Here, a scale of the vector $v_{axis}$ is in accordance with a predetermined angle (rad.) at which rotation is carried out at step S12.

$R_{axis}$ in the formula (5) corresponds to a rotation matrix in the case where the rotary axis CA is translated to an original point of the rectangular coordinate system HT, and $R_{axis}$ is expressed by the following formula (6).

$$R_{axis}=r(v_{axis},\|v_{axis}\|) \tag{6}$$

$$\left. \begin{array}{l} r(a, angle) = bb^t + \cos(angle)(I - bb^t) + \sin(angle)[a]_x \\ b = a/\|a\| \\ [a]x = \begin{bmatrix} 0 & -a_z & a_y \\ a_z & 0 & -a_x \\ -a_y & a_x & 0 \end{bmatrix}, a = \begin{bmatrix} a_x \\ a_y \\ a_z \end{bmatrix} \end{array} \right\} \tag{7}$$

However, a content of a function r in the formula (6) is represented by the above formula (7).

As mentioned above, the respective relations in the case where the rotary stage 31 is rotated are derived, but a process for obtaining the perspective conversion matrix $P_1$ having twelve parameters (elements) and a process for obtaining five parameters $x_a$, $y_a$, $z_a$, $x_p$ and $z_p$ for specifying the rotary axis CA is executed as mentioned below.

Firstly, a schematic perspective conversion matrix $Ph_1$ relating to a reference image is obtained. Concretely, the publicly known DLT (direct linear transform) method is used so as to obtain $Ph_1$. As the DLT method, a technique disclosed in "Multiple View Geometry in Computer Vision", R. I. Hartley A. Zisserman, Cambridge University Press, 2000 may be utilized.

Next, the obtained schematic perspective conversion matrix $Ph_1$ is used so that the reference points $M_i$ on the chart TC are projected onto a first image surface as expressed in the following formula (8).

$$mh1_i = Ph_1 M_i \tag{8}$$

Here, since the projected points $mh1_i$ have strong possibility of including an error, the projected points $mh1_i$ are compared with the reference points $m1_i$ which appear on the actual reference image. Here, for example as expressed in the following formula (9), a deviation between the projected points $mh1_i$ and the reference points $m1_i$ of the reference image is evaluated.

$$d(mh1_i, m1_i) = \{(mh1_i/\|mh1_i\|) \times (m1_i/\|m1_i\|)\} \cdot \{(mh1_i/\|mh1_i\|) \times (m1_i/\|m1_i\|)\} \tag{9}$$

However, "x" in the formula (9) represents vector product.

As for the rotary image, similarly after a schematic perspective conversion matrix $Ph_2$ is obtained, an evaluation function E shown in the following formula (10) is set.

$$E = \sum_i (d(mh1_i, m1_i) + d(mh2_i, m2_i)) \tag{10}$$

$Ph_1$ and $Ph_2$ when E in the formula (10) becomes minimum are determined as the perspective conversion matrices $P_1$ and $P_2$ by a nonlinear minimum square method such as Levenberg-Marquart method. Moreover, when $P_1$ and $P_2$ are determined, the rotation matrix Q is obtained from the formula (3).

Meanwhile, an internal parameter matrix A of the photographing device 2 can be obtained by dissolving $P_1$ as expressed in the following formula (11).

$$P_1 = A[R\ t] \tag{11}$$

However, R and t in the formula (11) are matrices representing relative rotation and parallel movement (translation) of the photographing visual point with respective to the rotation axis CA. The internal parameters represent photographing conditions and the like in the photographing position, and are univocally determined based on information such as a focal length and a center of an optical axis at the time of photographing.

Figure 7:
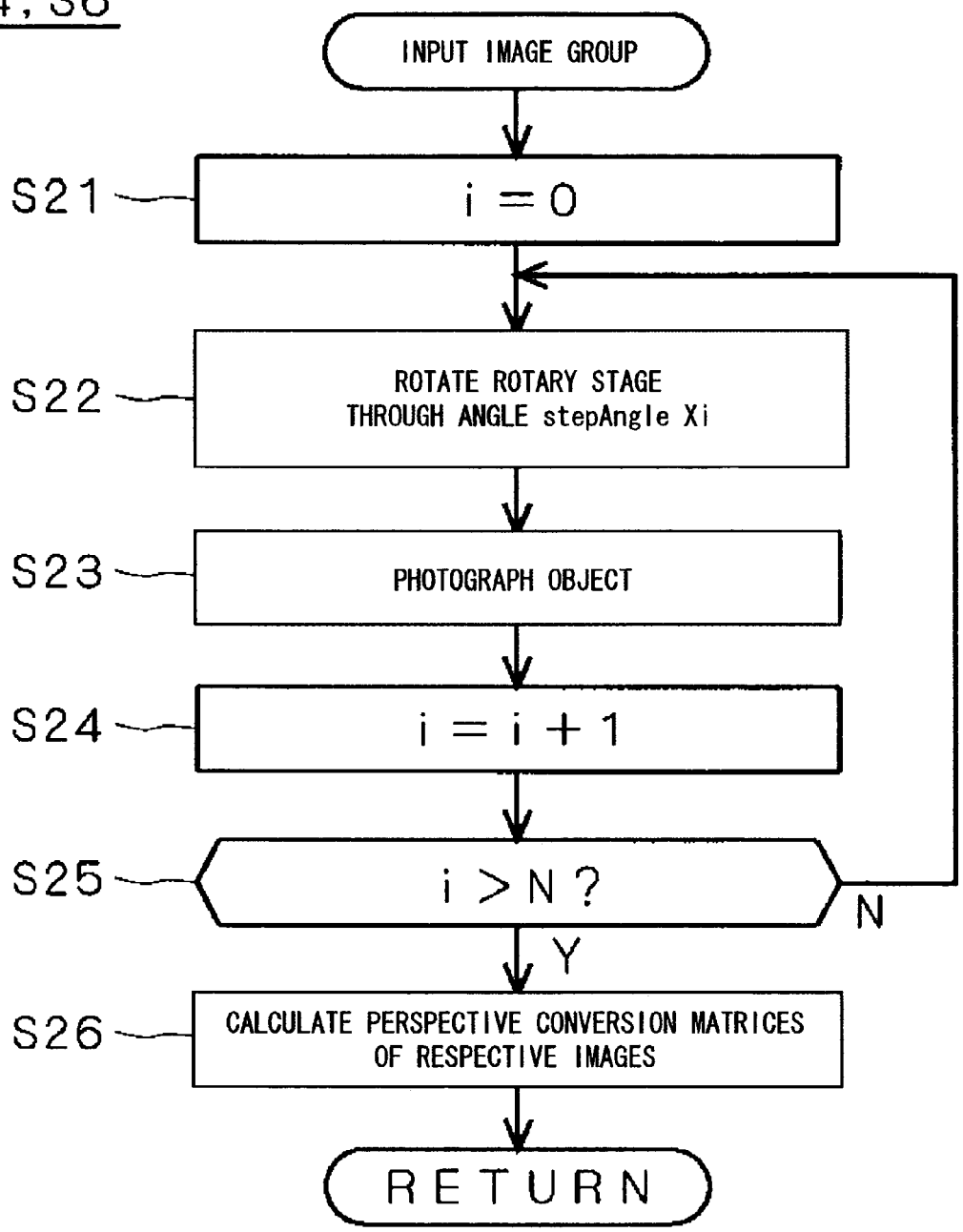
FIG. 7 is a flowchart for explaining an inputting operation of an image group.

FIG. 7 is a flowchart for explaining the input operation of the image groups corresponding to the steps S4 and S6.

0 is substituted as initial value into a variable i at step S21.

The rotary stage 31 is rotated through an angle obtained by multiplying a predetermined angle stepAngle and the variable i together at step S22. As a result, the direction of the object SB can be changed by each predetermined angle stepAngle.

The object SB placed on the rotary stage 31 is photographed by the photographing device 2 so that image data are obtained at step S23.

The object SB can be photographed from the photographing position which moves relatively on a predetermined path (first path or second path) specified around the object SB by the operations at steps S22 and S23. Here, the predetermined path can be derived based on the rotation matrix Q obtained at step S14.

i+1 is substituted into the variable i at step S24.

A judgment is made whether the variable i is larger than N at step S25. Here, N is set to a value obtained by dividing $2\pi$ by stepAngle (rad.), and the judgment is made whether the object SB is rotated once about the rotary axis CA. When the variable i is larger than N, the process goes to step S26, and when not more than N, returns to step S22.

Perspective conversion matrices relating to the respective images obtained at step S23 are obtained at step S26. As a matter of convenience for explaining the perspective conversion matrices, the perspective conversion matrix $P1_i$ (0<i<N) relating to the first image group obtained at step S4 is obtained.

The perspective conversion matrix $P1_i$ is obtained as expressed in the following formula (12) by utilizing the perspective conversion matrix $P_1$ calculated at step S14.

$$P1_i = P_1 Q_i \tag{12}$$

$$Q_i = q(v_i, p_{axis}) \tag{13}$$

$$v_i = (\text{stepAngle}*i)v_{axis}/\|v_{axis}\| + v_{axis} \tag{14}$$

$Q_i$ in the formula (12) is expressed in the formula (13) by utilizing a function q in the formula (5), and $v_i$ in the formula (13) is calculated as expressed in the formula (14).

The Shape From Silhouette method (hereinafter, referred to as "SFS method") is utilized so that three-dimensional shape data of the object SB can be generated by using the obtained perspective conversion matrix $P1_i$. The method of generating the three-dimensional shape data will be explained below by exemplifying the first image group.

Figure 8:
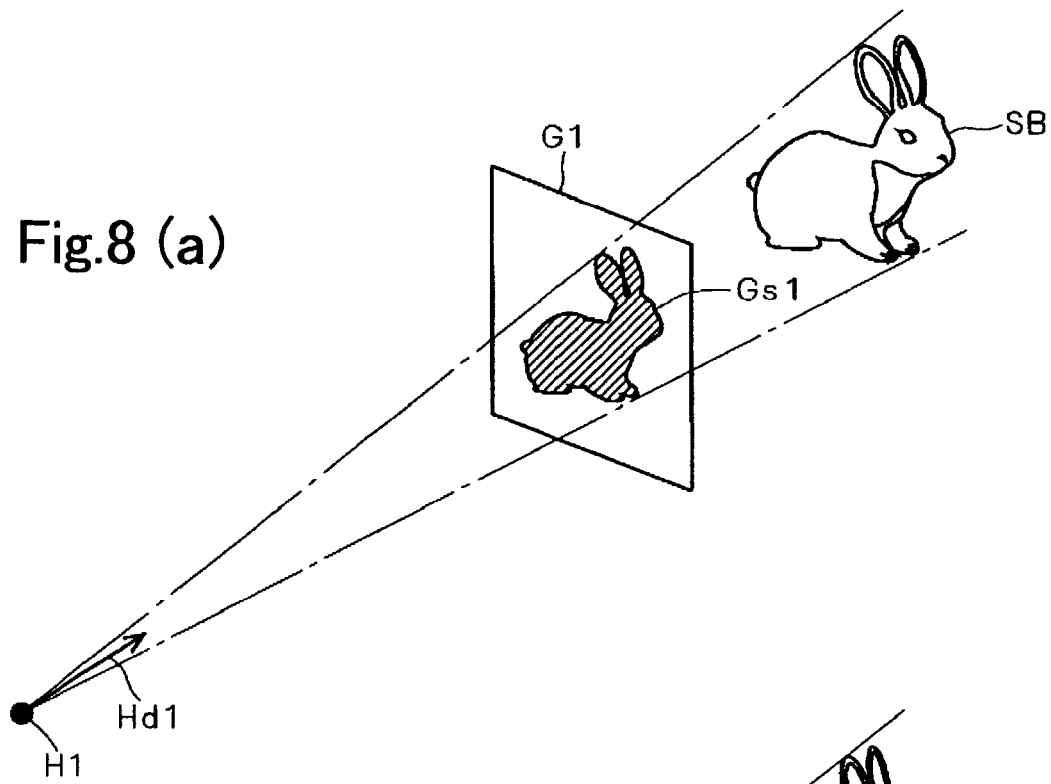
FIGS. 8(a) and 8(b) are diagrams for explaining an SFS (Shape From Silhouette) method.
Figure 8:
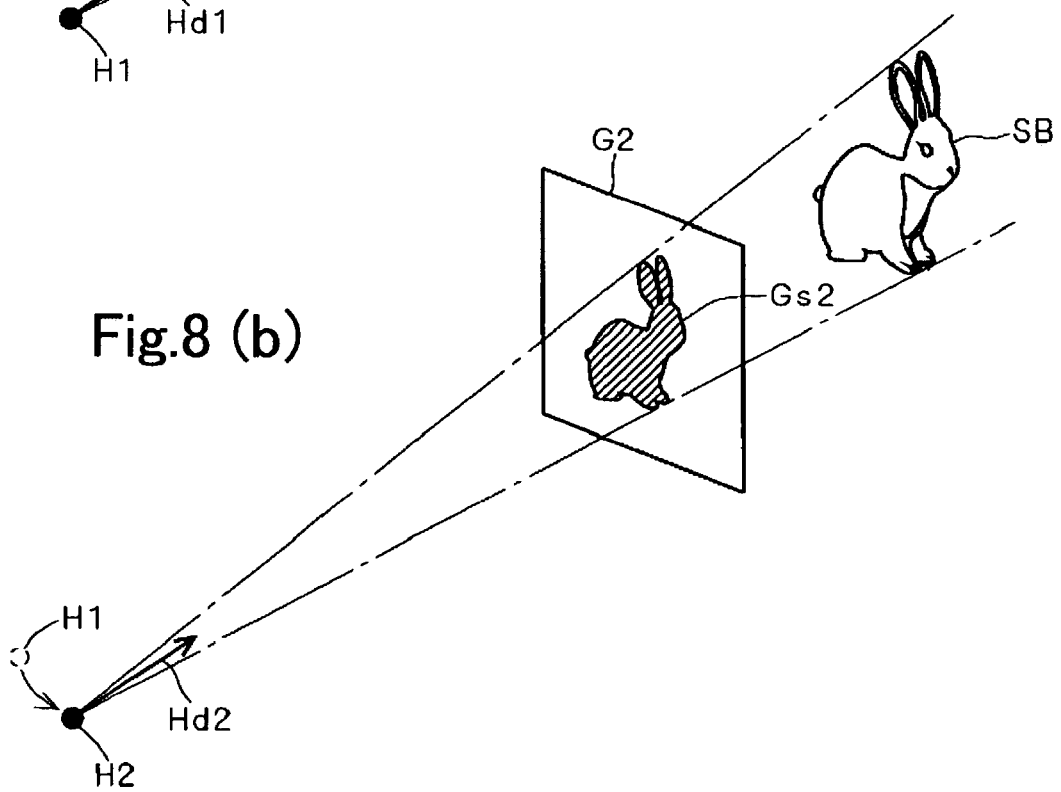

FIGS. 8(*a*) and 8(*b*) are diagrams for explaining the SFS method. FIGS. 8(*a*) and 8(*b*) are diagrams for explaining states that the object SB rotated by each angle stepAngle is photographed.

Silhouette images G1 and G2, in which areas Gs1 and Gs2 (portions shown by parallel slanted lines) showing the outline of the shape SB are extracted, are obtained from the images obtained by photographing the object SB. After the outline of the object SB is extracted from the silhouette images G1 and G2 based on a color difference between a surface of the object and the background, for example, binarized image data (two-dimensional outline data) in which the inside of the outline is "1" and the outside of the outline is "0" are generated. Namely, the silhouette images G1 and G2 are silhouettes of the object SB viewed from different visual points (photographing positions) H1 and H2 to line of sight directions (photographing directions) Hd1 and Hd2, namely, projected images of the object SB onto a two-dimensional space in which the visual points H1 and H2 are the center. As shown in FIG. 8(b), the visual point viewed from the object SB moves relatively from H1 to H2.

All the images, which include the silhouette images G1 and G2 and have been successively obtained by rotating the rotary stage 31 once about the rotary axis CA, can be related to a predetermined three-dimensional coordinate system (first three-dimensional coordinate system) by using the perspective conversion matrices $P1_i$ obtained by the formula (12) for the respective rotating angles of the rotary stage 31. As a result, the two-dimensional shapes which are the silhouette areas of the object SB can be integrated by using the SFS method, so that the three-dimensional shape data of the object SB can be generated.

The above explained the first image group obtained at step S4, but as for the second image group, which are successively obtained at step S6 when the object SB in the second posture is placed on the rotary stage 31, similarly silhouette images are generated, and the silhouette images can be related to a second three-dimensional coordinate system different from the first three-dimensional coordinate system by perspective conversion matrices $P2_i$ calculated by substituting the left side of the formula (8) for $P2_i$. For example, the second image group is obtained by the photographing device 2 under the same condition as that of the first image group without changing, for example, a zoom magnification or the like.

In the case where the three-dimensional shape data of the object SB generated from the first image group is integrated with the three-dimensional shape data of the object SB generated from the second image group, the relative positional relationship between the first three-dimensional coordinate system and the second three-dimensional coordinate system should be grasped. The method of obtaining the relative information will be explained below.

Figure 9:
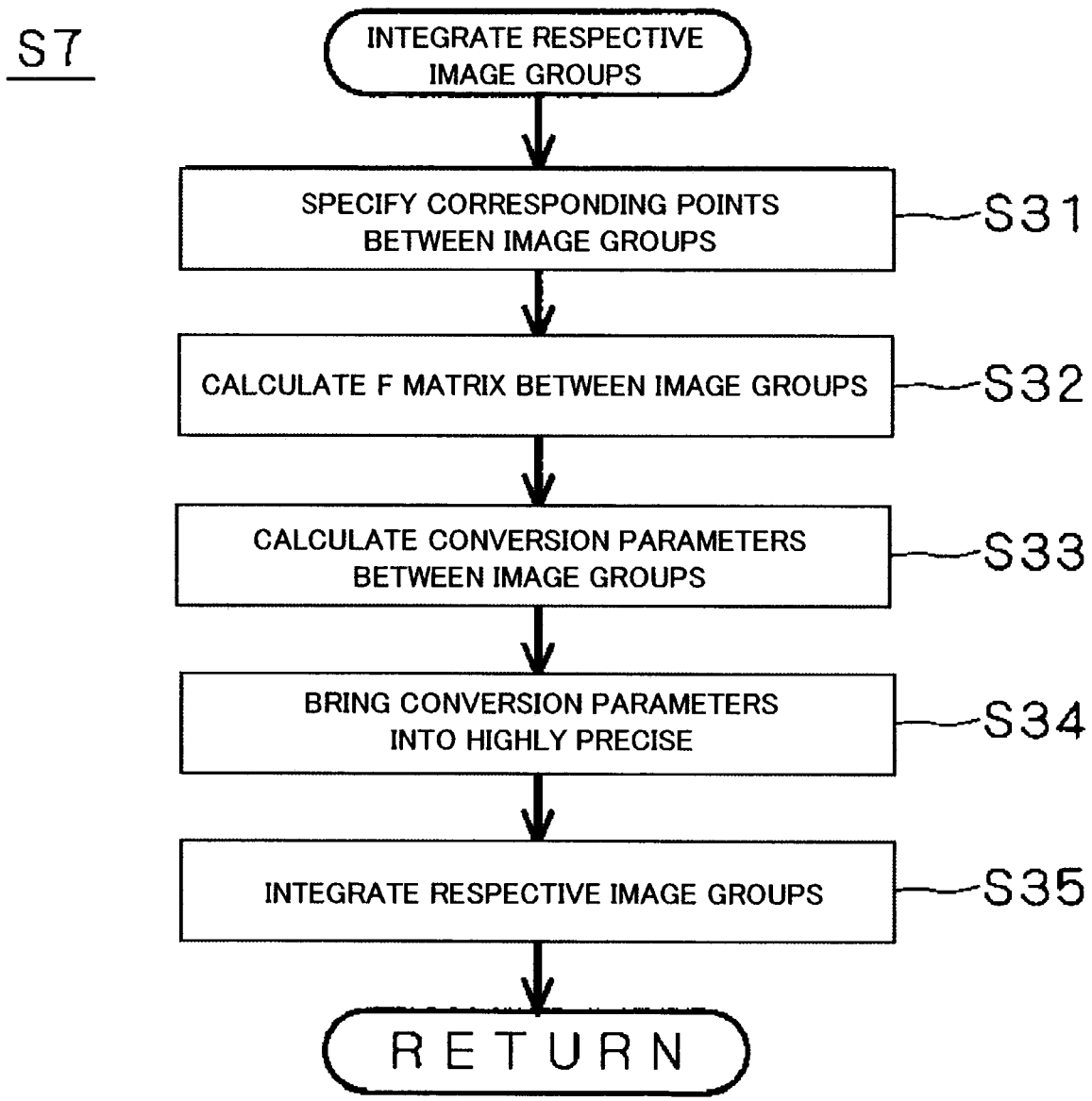
FIG. 9 is a flowchart for explaining an integrating operation of respective image groups.

FIG. 9 is a flowchart for explaining the operation for integrating the image groups corresponding to step S7 described above.

Figure 10:
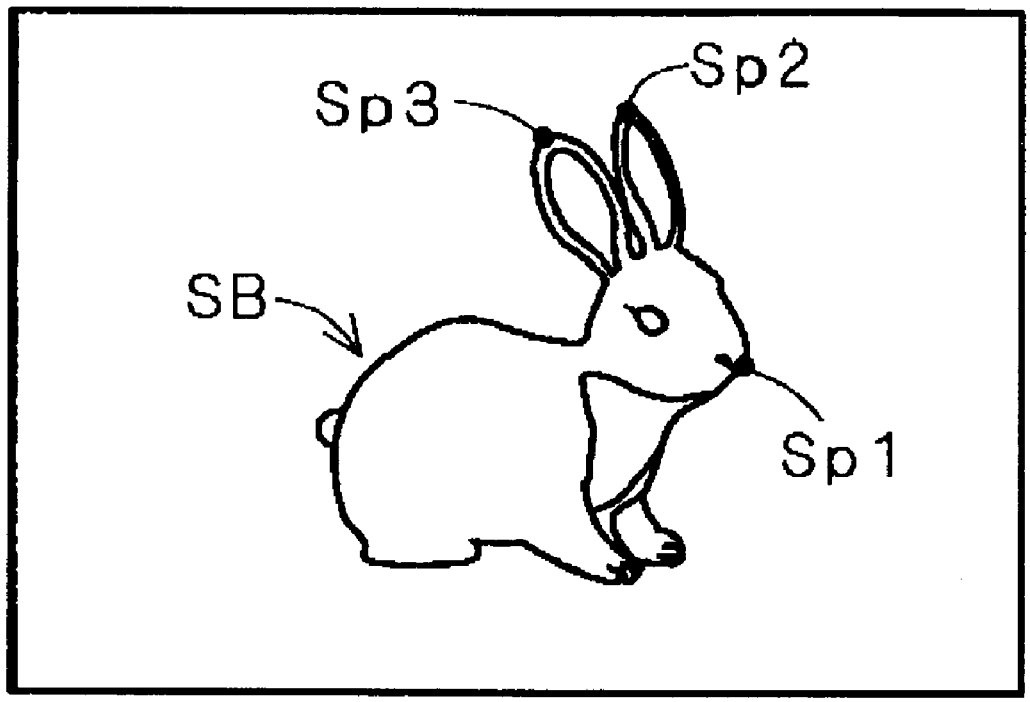
FIGS. 10(a) and 10(b) are diagrams for explaining specifying of corresponding points of the object SB in a pair of images.
Figure 10:
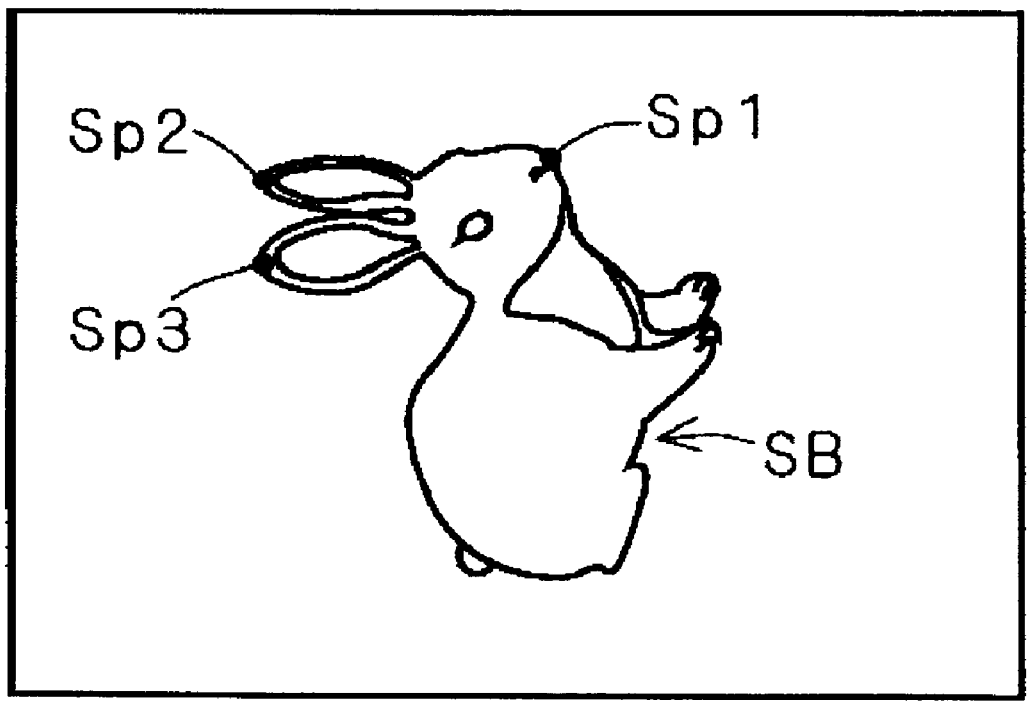

At step S31, one image (partial first image) is extracted from the first image group and one image (partial second image) is extracted from the second image group, so that a plurality of characteristics which appear on the object SB on a pair of the images, for example, eight points or more such as a muffle Sp1, tips of ears Sp2 and Sp3 are specified. Concretely, a plurality of corresponding points (first corresponding points) Sp1, Sp2 and Sp3 are specified on the image shown in FIG. 10(a), and a plurality of corresponding points (second corresponding points) Sp1, Sp2 and Sp3 are specified on the image shown in FIG. 10(b).

At step S32, a schematic F matrix (Fundamental Matrix) is calculated between the image groups based on the plural corresponding points specified on a pair of the images extracted at step S31. The calculation of the F matrix may utilize the technique disclosed in "Multiple View Geometry in Computer Vision", R. I. Hartley A. Zisserman, Cambridge University Press, 2000.

A conversion parameter S between the first image group and the second image group corresponding to the relative information between the first three-dimensional coordinate system and the second three-dimensional coordinate system is calculated at step S33.

The F matrix calculated at step S32 can be dissolved as expressed in the following formula (15).

$$F = A^{-t}[t] \times R A^{-1} \tag{15}$$

However, $$[t]_x = \begin{bmatrix} 0 & -t_z & t_y \\ t_z & 0 & -t_x \\ -t_y & t_x & 0 \end{bmatrix}, t = \begin{bmatrix} t_x \\ t_y \\ t_z \end{bmatrix}$$

Here, the matrix A in the formula (15) is calculated in the formula (11) at the time of the calibration of the internal parameter matrix of the photographing device 2. Moreover, matrices R and t in the formula (15) are matrices representing relative rotation and movement of the photographing visual points similarly in the formula (11).

The matrices R and t obtained by the formula (15) are used so that the conversion parameter S between the first image group and the second image group can be obtained by the following formula (16).

$$S = \begin{bmatrix} R & t \\ 0 & 1 \end{bmatrix} \tag{16}$$

The conversion parameter S is brought into highly precise at step S34. The conversion parameter S is calculated at step S33 based on a pair of the images extracted from the first image group and the second image group, but since the images obtained from the approximately same visual point positions are used, when an error occurs in the specification of corresponding points, this error greatly influences the integration of the image groups. Therefore, a method of improving the accuracy of the conversion parameter S using more images will be explained.

When the relationship between a perspective conversion matrix $P1_m$ of the m-th image in the first image group and a perspective conversion matrix $P2_n$ of the n-th image in the second image group is expressed by using the conversion parameter S and the rotation matrix Q, the formulas (17) through (19) are established.

$$P2_n = P1_m S \tag{17}$$

$$P2_0 Q_n = P1_0 Q_m S \tag{18}$$

$$P2_0 = P1_0 Q_m S Q_n^{-1} \tag{19}$$

Therefore, a perspective conversion matrix $P2_i$ of the i-th image in the second image group can be expressed by the following formula (20).

$$P2_i = P1_0 Q_m S Q_n^{-1} Q_i \tag{20}$$

Perspective conversion matrices $P1_i$ and $P2_j$ of the i-th image in the first image group and the j-th image in the second image group can be expressed by the following formula (21).

$$P2_j = P1_o Q_i Q_i^{-1} Q_m S Q_n^{-1} Q_j$$

$$P1_i Q_i^{-1} Q_m S Q_n^{-1} Q_j \quad (21)$$

When $R_w$ and $t_w$ are set in the formula (21) like the following formula (22), a matrix $F_{ij}$ between the i-th image in the first image group and the j-th image in the second image group can be expressed in the following formula (23).

$$W = Q_i^{-1} Q_m S Q_n^{-1} Q_j = \begin{bmatrix} R_w & t_w \\ 0 & 1 \end{bmatrix} \quad (22)$$

$$F_{ij} = A^{-t} [t_w]_x R_w A^{-1} \quad (23)$$

Here, the conversion parameter S is considered as a function composed of three parameters relating to the rotation matrix and three parameters relating to the parallel movement, and the accurate conversion parameter S is calculated by using the nonlinear minimum square method.

In this case, as shown in the following formula (24), an evaluation function $E_F$ utilizing epipolar constraint is set so that a basic matrix $F_{ij}$ in which an absolute value of the evaluation function $E_F$ becomes minimum is obtained.

$$EF = \sum_i \sum_j \sum_k g2_{ijk}^t F_{ij} g1_{ijk} \quad (24)$$

However, $g1_{ijk}$ and $g2_{ijk}$ show k-th corresponding points of the object SB on the i-th image in the first image group and the j-th image in the second image group.

The conversion parameter S can be calculated accurately from the obtained basic matrix $F_{ij}$ according to the formulas (15) and (16).

The conversion parameter S calculated accurately at step S34 is utilized so that the first image group relating to the first three-dimensional coordinate system is integrated with the second image group relating to the second three-dimensional coordinate system at step S35. As a result, the three-dimensional shape data which reproduces the shape of the object SB accurately can be generated.

Since corresponding points of the object are specified on a partial image in the first image group and a partial image in the second image group so that the conversion parameter is calculated by the above-mentioned data processing method, the first image group can be integrated with the second image group easily and suitably.

<Second Embodiment>

<Main Section Structure of the Three-dimensional Data Processing System>

Figure 11:
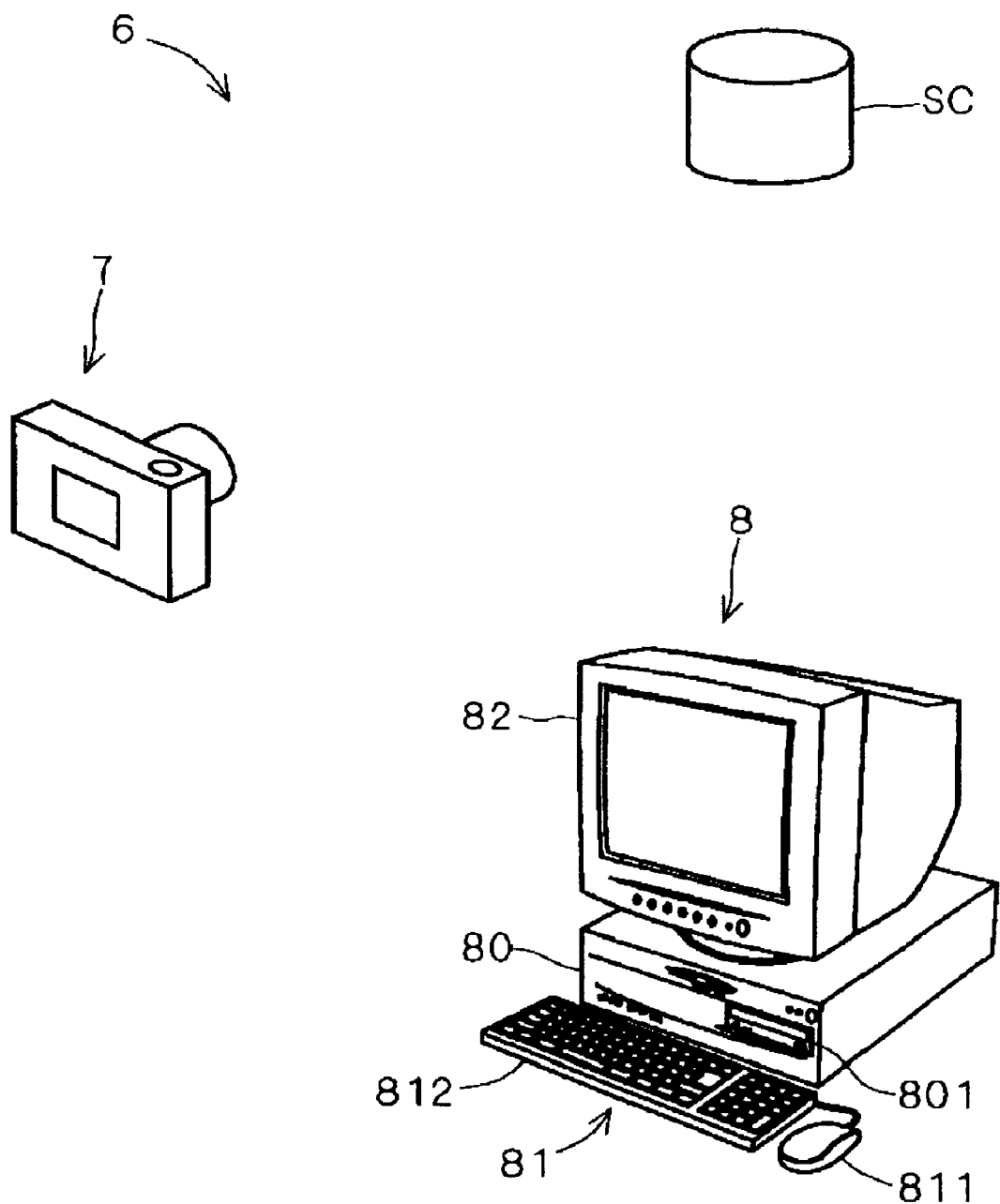
FIG. 11 is a schematic diagram showing a main section structure of a three-dimensional data processing system 6 according to a second embodiment of the present invention.

FIG. 11 is a schematic diagram showing a main section structure of a three-dimensional data processing system 6 according to the second embodiment of the present invention.

The three-dimensional data processing system 6 has a structure such that the rotating device 3 is omitted from the three-dimensional data processing system 1 of the first embodiment and a photographing device 7 and a processing unit 8 are provided.

In the three-dimensional data processing system 6, an object SC is fixed into a three-dimensional space and the photographing device 7 is moved so as to photograph the object SC differently from the first embodiment.

Figure 12:
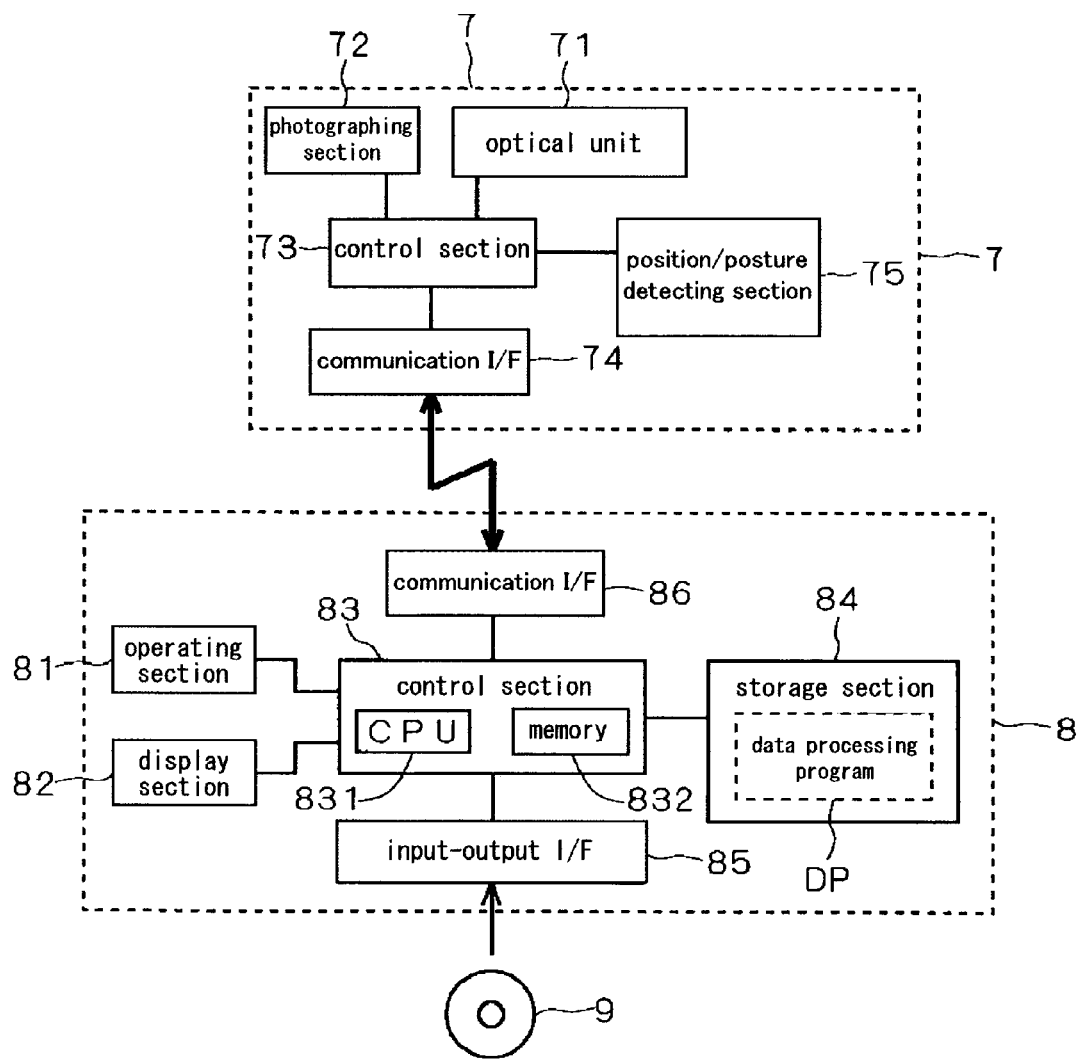
FIG. 12 is a diagram showing a function block of the three-dimensional data processing system 6.

FIG. 12 is a diagram showing a function block of the three-dimensional data processing system 6.

The photographing device 7 has the similar structure to that of the photographing device 2 in the first embodiment, but is different in that a position/posture detecting section 75 is added.

The position/posture detecting section 75 has, for example, an acceleration sensor and a gyroscope, and detects a three-dimensional position of the photographing device 7 and a posture of the photographing device 7 for determining the photographing direction. The position/posture detecting section 75 becomes a portion which is a substitute for the rotating device 3 of the first embodiment.

The photographing device 7 and the processing unit 8 radio-transmit data to each other utilizing infrared communication or the like according to IrDA (Infrared Data Association) standard via the communication I/Fs 74 and 86.

<Data Processing Method Utilizing the Three-dimensional Data Processing System 6>

The data processing method according to the second embodiment is similar to the data processing method according to the first embodiment shown in FIG. 3, but the input operations on the image groups at steps S4 and S6 shown in FIG. 3 are different from each other. The input operation on the image groups will be explained below.

Figure 13:
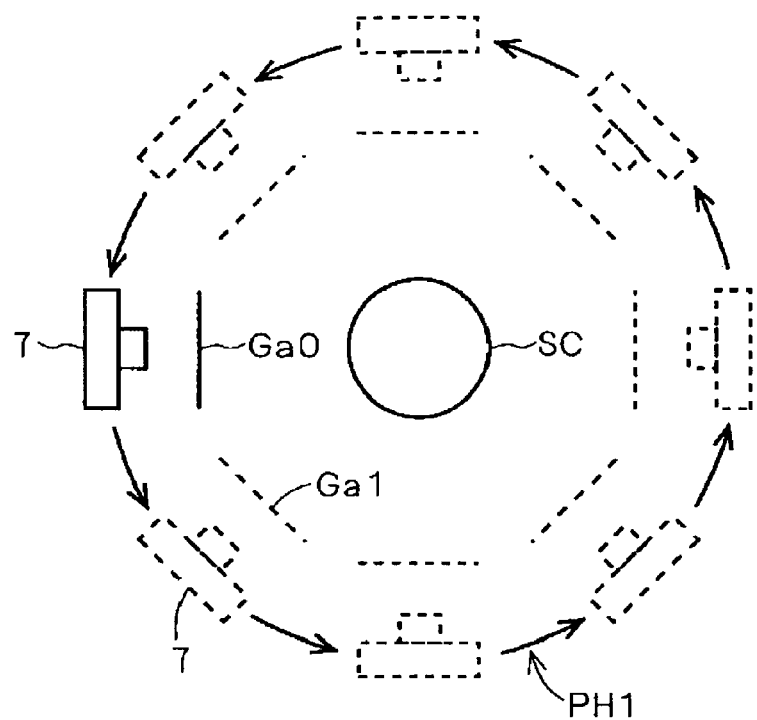
FIG. 13 is a top view showing a state that an object SC in the first posture is photographed by a photographing device 7.
Figure 14:
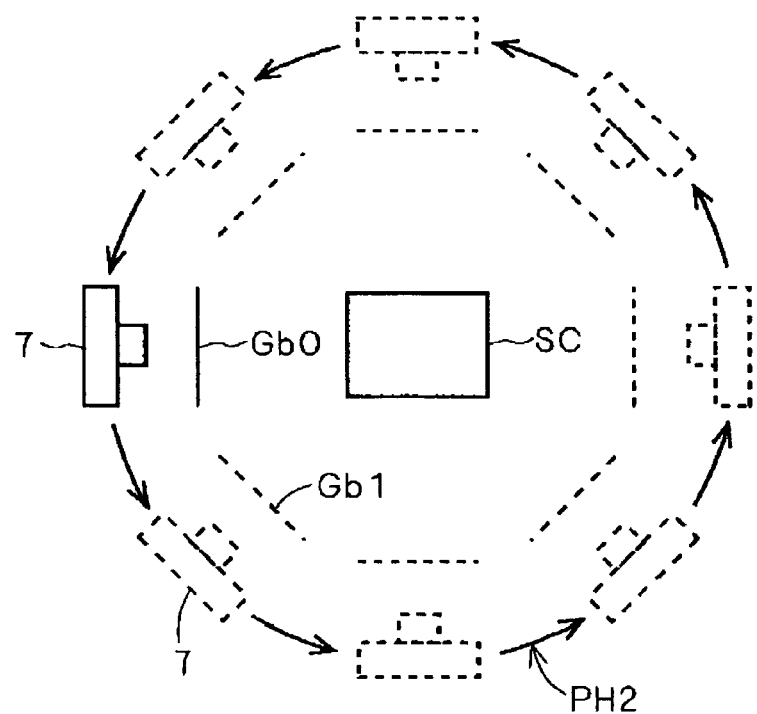
FIG. 14 is a top view showing a state that the object SC in the second posture is photographed by the photographing device 7.

FIGS. 13 and 14 are top views showing states that the object SC is photographed by the photographing device 7.

In the input of the first image group corresponding to step S3, the object SC is placed longitudinally, namely, in the first posture (see FIG. 1) as shown in FIG. 13, and while the photographing device 7 is moving (rotating) once along the first path PH defined on a meridian around the object SC, a lot of images Ga0, Ga1, . . . (first image group) are obtained. Here, the internal parameters such as the zoom magnification of the photographing device 7 are not changed and the photographing is carried out.

In the input of the second image group corresponding to step S5, the direction of the object SC is changed 90° from the first posture into horizontal posture, namely, the second posture as shown in FIG. 14, and while the photographing device 7 is once moving around the second path PH2 defined on a parallel around the object SC, a lot of images Gb0, Gb1, . . . (second image group) are obtained. In this case, the internal parameters such as the zoom magnification of the photographing device 7 are not changed, and the photographing is carried out under the same condition as that of the photographing of the first image group.

The first image group and the second image group obtained in such a manner are integrated by the process shown in the flowchart in FIG. 9, but this concept will be explained below.

Figure 15:
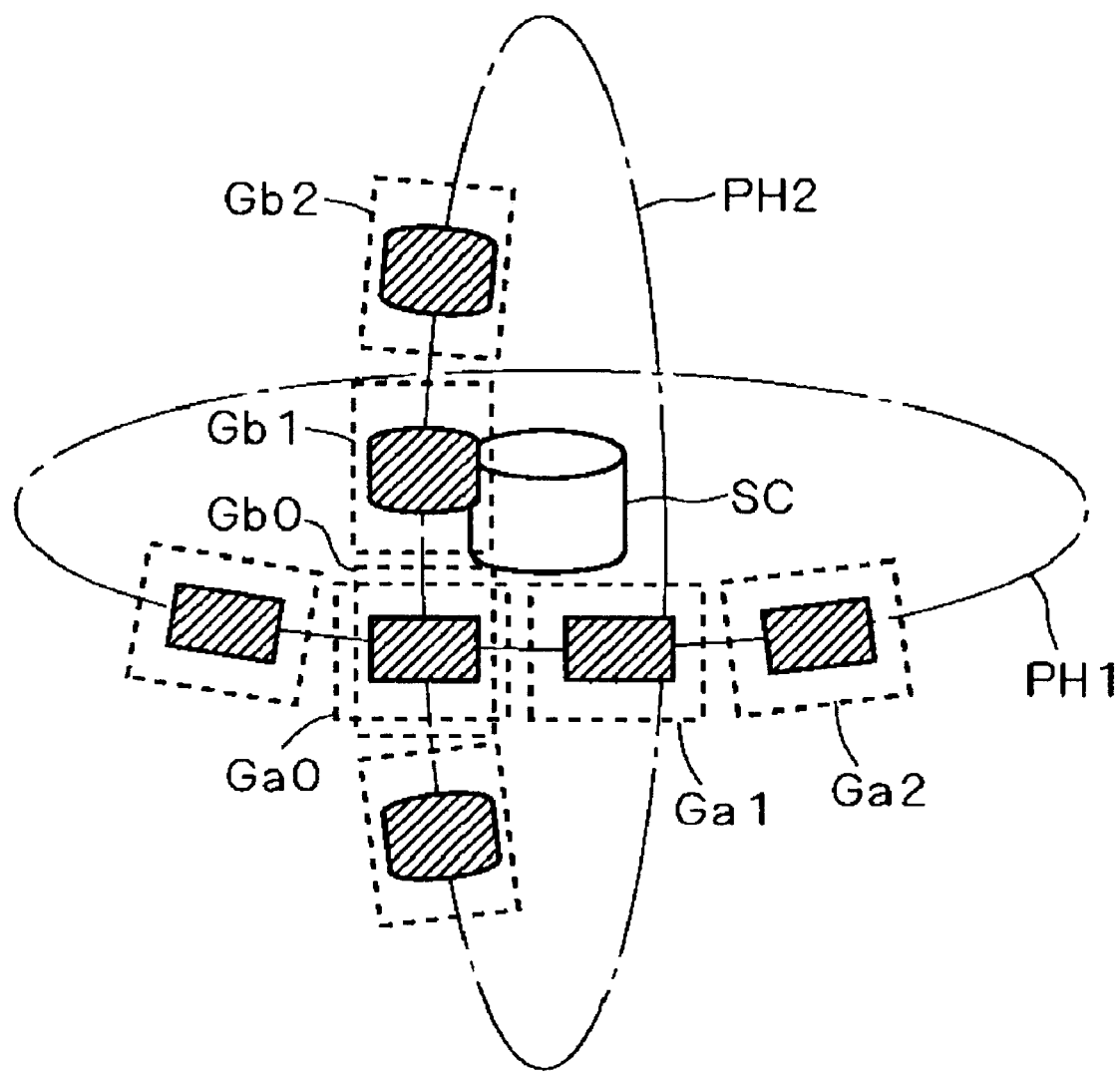
FIG. 15 is a diagram for conceptually explaining integration of a first image group and a second image group.

FIG. 15 is a diagram for conceptually explaining the integration of the first image group and the second image group. In this drawing, the first image group is arranged on the first path PH1 shown in FIG. 13, and the second image group is arranged on the second path PH2 shown in FIG. 14.

In this case, to integrate the first image group and the second image group means that the relative positional relationship between the first path PH1 and the second path PH2 is clarified via an actual three-dimensional coordinate system where the object SC exists.

For example, in the case where one image Ga0 is selected from the first image group and one image Gb0 is selected from the second image group at step S31 (FIG. 9), corresponding points are specified on this pair of the images, so that the relative positional relationship in the three-dimensional space between the first path PH1 and the second path PH2 is schematically determined. Here, since the relative positions of the first path PH1 and the second path PH2 are determined by corresponding of a minute section (the section corresponding to the representative image Ga0) of the first path PH1 and a minute section (the section corresponding to the representative image Gb0) of the second path PH2, it is difficult to derive the relative relationship accurately.

Images extracted from the respective image groups other than the above pair of the images are utilized so that the accuracy is improved at step S34 (FIG. 9). For example, corresponding relationships between images Ga1 and Ga2 extracted from the first image group and the images Gb1 and Gb2 extracted from the second image group are further specified, so that the relative positions of the first path PH1 and the second path PH2 can be constrained on the wide sections of the first path PH1 and the second path PH2. A a result, the relative positional relationship between the first path PH1 and the second PH2 can be derived accurately.

The above data processing method can execute the integrating process of the first image group and the second image group easily and suitable similarly to the first embodiment.

The first path PH1 and the second path PH2 shown in FIG. 15 are expressed as two circles having equal radius, but in the case where the moving path of the photographing position is a closed curve such as an ellipse, this closed curve is drawn. Moreover, in FIG. 15, the two circles PH1 and PH2 cross at the image Ga0 as a matter of convenience for the explanation, but mostly they do not generally cross.

<Modified Example>

In the above embodiments, it is inessential that the two image groups are integrated, and three or more image groups may be integrated together. For example in the case where three image groups are integrated, similarly to the above embodiments, partial images are extracted from the respective groups and corresponding points are specified. Also in this case, the easy and suitable integrating process is possible.

As explained above, according to first through fifth aspects, relative information between a first three-dimensional coordinate system relating to plural first images and a second three-dimensional coordinate system relating to plural second images is obtained based on a plurality of first corresponding points and a plurality of second corresponding points. The first corresponding points are specified correspondingly to plural points appearing on a solid object on a partial first image. The second corresponding points are specified correspondingly to plural points on a partial second image. As a result, the obtained relative information about the first three-dimensional coordinate system and second three-dimensional coordinate system is utilized, so that the integrating process relating to the plural image groups can be executed easily and suitably.

Particularly in the second aspect, while the solid object is held in the first posture and is being rotated about a predetermined rotary axis, the solid object is photographed from a fixed position, and while the solid object is held in the second posture and is being rotated about a predetermine rotary axis, the solid object is photographed from a fixed position. As a result the first path and the second path can be defined easily.

In addition, in the third aspect, relative rotation information of the photographing position relating to the predetermined rotary axis is previously obtained, and the first path and the second path are derived based on the relative rotation information of the photographing position. As a result, the first path and the second path can be obtained suitably.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data processing method of handing a plurality of two-dimensional data to be the base for generating three-dimensional shape data for reproducing a solid object, the method comprising the steps of:
    (a) the first obtaining step of successively photographing the solid object along a first path around the solid object so as to obtain a plurality of first images;
    (b) the step of relating the plural first images to each other in a first three-dimensional coordinate system;
    (c) the second obtaining step of successively photographing the solid object along a second path around the solid object so as to obtain a plurality of second images;
    (d) the step of relating the plural second images to each other in a second three-dimensional coordinate system;
    (e) the first specifying step of specifying a plurality of first corresponding points corresponding to a plurality of points appearing on the solid object on a partial first image extracted from the plural first images;
    (f) the second specifying step of specifying a plurality of second corresponding points corresponding to the plural points on a partial second image extracted from the plural second images; and
    (g) the step of obtaining relative information about the first three-dimensional coordinate system and the second three-dimensional coordinate system based on the plural first corresponding points specified on the partial first image and the plural second corresponding points specified on the partial second image.

2. A data processing method according to claim 1, wherein
    the first obtaining step includes
    (a-1) the step of while rotating the solid object about a predetermined rotary axis in a state that the a tilt posture of the solid object with respect to an axial direction of the predetermined rotary axis is held in a first posture, photographing the solid object from a predetermined photographing position fixed in a three-dimensional space so as to obtain the plural first images, and
    the second obtaining step includes
    (c-1) the step of while rotating the solid object about the predetermined rotary axis in a state that the tilt posture of the solid object with respect to the axial direction of the predetermined rotary axis is held in a second posture, photographing the solid object from the predetermined photographing position so as to obtain the plural second images.

3. A data processing method according to claim 2, further comprising the step of obtaining relative rotation information for defining a relative rotational relationship between the photographing position and the rotary axis before the first obtaining step and the second obtaining step, wherein
    the first path and the second path are derived based on the relative rotation information of the predetermined photographing position.

4. A data processing program for a data processing method of handing a plurality of two-dimensional data to be the base for generating three-dimensional shape data for reproducing a solid object, the data processing program causing the processing unit to execute following steps of:

(a) the first obtaining step of successively photographing the solid object along a first path around the solid object so as to obtain a plurality of first images;

(b) the step of relating the plural first images to each other in a first three-dimensional coordinate system;

(c) the second obtaining step of successively photographing the solid object along a second path around the solid object so as to obtain a plurality of second images;

(d) the step of relating the plural second images to each other in a second three-dimensional coordinate system;

(e) the first specifying step of specifying a plurality of first corresponding points corresponding to a plurality of points appearing on the solid object on a partial first image extracted from the plural first images;

(f) the second specifying step of specifying a plurality of second corresponding points corresponding to the plural points on a partial second image extracted from the plural second images; and (g) the step of obtaining relative information about the first three-dimensional coordinate system and the second three-dimensional coordinate system based on the plural first corresponding points specified on the partial first image and the plural second corresponding points specified on the partial second image.

5. A data processing program for a data processing method according to claim 4, wherein the first obtaining step includes (a-1) the step of while rotating the solid object about a predetermined rotary axis in a state that the a tilt posture of the solid object with respect to an axial direction of the predetermined rotary axis is held in a first posture, photographing the solid object from a predetermined photographing position fixed in a three-dimensional space so as to obtain the plural first images, and the second obtaining step includes (c-1) the step of while rotating the solid object about the predetermined rotary axis in a state that the tilt-posture of the solid object with respect to the axial direction of the predetermined rotary axis is held in a second posture, photographing the solid object from the predetermined photographing position so as to obtain the plural second images.

6. A data processing program for a data processing method according to claim 5, further comprising the step of obtaining relative rotation information for defining a relative rotational relationship between the photographing position and the rotary axis before the first obtaining step and the second obtaining step, wherein the first path and the second path are derived based on the relative rotation information of the predetermined photographing position.

7. A computer program product for a data processing method of handing a plurality of two-dimensional data to be the base for generating three-dimensional shape data for reproducing a solid object, the computer program product being embodied in a computer readable medium and comprising computer instructions of:

(a) the first obtaining step of successively photographing the solid object along a first path around the solid object so as to obtain a plurality of first images;

(b) the step of relating the plural first images to each other in a first three-dimensional coordinate system;

(c) the second obtaining step of successively photographing the solid object along a second path around the solid object so as to obtain a plurality of second images;

(d) the step of relating the plural second images to each other in a second three-dimensional coordinate system;

(e) the first specifying step of specifying a plurality of first corresponding points corresponding to a plurality of points appearing on the solid object on a partial first image extracted from the plural first images;

(f) the second specifying step of specifying a plurality of second corresponding points corresponding to the plural points on a partial second image extracted from the plural second images; and (g) the step of obtaining relative information about the first three-dimensional coordinate system and the second three-dimensional coordinate system based on the plural first corresponding points specified on the partial first image and the plural second corresponding points specified on the partial second image.

8. A computer program product for a data processing method according to claim 7, wherein the first obtaining step includes (a-1) the step of while rotating the solid object about a predetermined rotary axis in a state that the a tilt posture of the solid object with respect to an axial direction of the predetermined rotary axis is held in a first posture, photographing the solid object from a predetermined photographing position fixed in a three-dimensional space so as to obtain the plural first images, and the second obtaining step includes (c-1) the step of while rotating the solid object about the predetermined rotary axis in a state that the tilt posture of the solid object with respect to the axial direction of the predetermined rotary axis is held in a second posture, photographing the solid object from the predetermined photographing position so as to obtain the plural second images.

9. A computer program product for a data processing method according to claim 8, further comprising the step of obtaining relative rotation information for defining a relative rotational relationship between the photographing position and the rotary axis before the first obtaining step and the second obtaining step, wherein the first path and the second path are derived based on the relative rotation information of the predetermined photographing position.

10. A data processing apparatus of handing a plurality of two-dimensional data to be the base for generating three-dimensional shape data for reproducing a solid object, the data processing apparatus comprising:

a photographer for successively photographing the solid object along a first path around the solid object so as to obtain a plurality of first images and the solid object along a second path around the solid object so as to obtain a plurality of second images;

a relating device for relating the plural first images to each other in a first three-dimensional coordinate system and the plural second images to each other in a second three-dimensional coordinate system;

a specifying device for specifying a plurality of first corresponding points corresponding to a plurality of points appearing on the solid object on a partial first image extracted from the plural first images and a plurality of second corresponding points corresponding to the plural points on a partial second image extracted from the plural second images; and a calculator for obtaining relative information about the first three-dimensional coordinate system and the second three-dimensional coordinate system based on the plural first corresponding points specified on the partial first image and the plural second corresponding points specified on the partial second image.

11. A data processing apparatus according to claim 10, wherein while rotating the solid object about a predetermined rotary axis in a state that the a tilt posture of the solid object with respect to an axial direction of the predetermined rotary axis is held in a first posture, the photographer photographs the solid object from a predetermined photographing position fixed in a three-dimensional space so as to obtain the plural first images, and while rotating the solid object about the predetermined rotary axis in a state that the tilt posture of the solid object with respect to the axial direction of the predetermined rotary axis is held in a second posture, the photographer photographs the solid object from the predetermined photographing position so as to obtain the plural second images.

12. A data processing apparatus according to claim 11, further comprising a obtaining device for obtaining relative rotation information for defining a relative rotational relationship between the photographing position and the rotary axis before the first obtaining step and the second obtaining step, wherein the first path and the second path are derived based on the relative rotation information of the predetermined photographing position.

* * * * *